United States Patent [19]

Broderick

[11] Patent Number: 4,472,171
[45] Date of Patent: Sep. 18, 1984

[54] METHOD AND SYSTEM FOR REMOVING SLAG

[75] Inventor: James E. Broderick, Brookfield, Conn.

[73] Assignee: Texaco Development Corporation, White Plains, N.Y.

[21] Appl. No.: 499,614

[22] Filed: May 31, 1983

[51] Int. Cl.³ .............................................. B01J 3/02
[52] U.S. Cl. ........................................ 48/62 R; 48/69; 48/77; 48/197 R; 48/DIG. 2; 48/DIG. 3; 110/165 R; 222/249; 414/214
[58] Field of Search ............. 48/DIG. 2, DIG. 3, 77, 48/67, 69, 197 R, 202, 206, 62 R; 222/249, 250, 596; 414/214; 110/165 R; 65/19

[56] References Cited

U.S. PATENT DOCUMENTS 2,399,884  5/1946  Noack ........................... 110/165 R
3,292,824 12/1966  Arp et al. ........................... 222/250
4,018,588  4/1977  Hardy, Jr. ........................... 65/19

Primary Examiner—Jay H. Woo
Assistant Examiner—Joye L. Woodard
Attorney, Agent, or Firm—Robert A. Kulason; Robert Knox, Jr.; Henry C. Dearborn

[57] ABSTRACT

Method and/or system for removing liquid slag from a pressurized gasifier. Hot liquid slag is quenched in a quenching medium such as water. The quenched and solidified slag is crushed to a maximum particle size. The crushed slag and quenching medium are alternatively connected to opposite ends of a floating piston while the other end is connected to an outlet for disposal of the slag. The crushed slag and quenching medium are subjected to the gasifier pressure so that the piston acts to forceably eject the mixture through the outlet.

9 Claims, 5 Drawing Figures

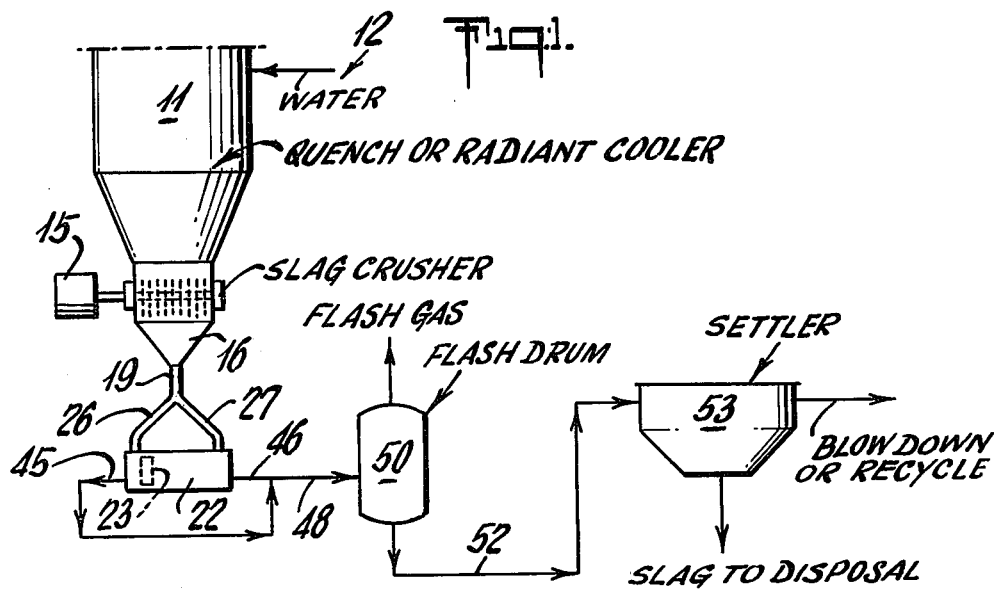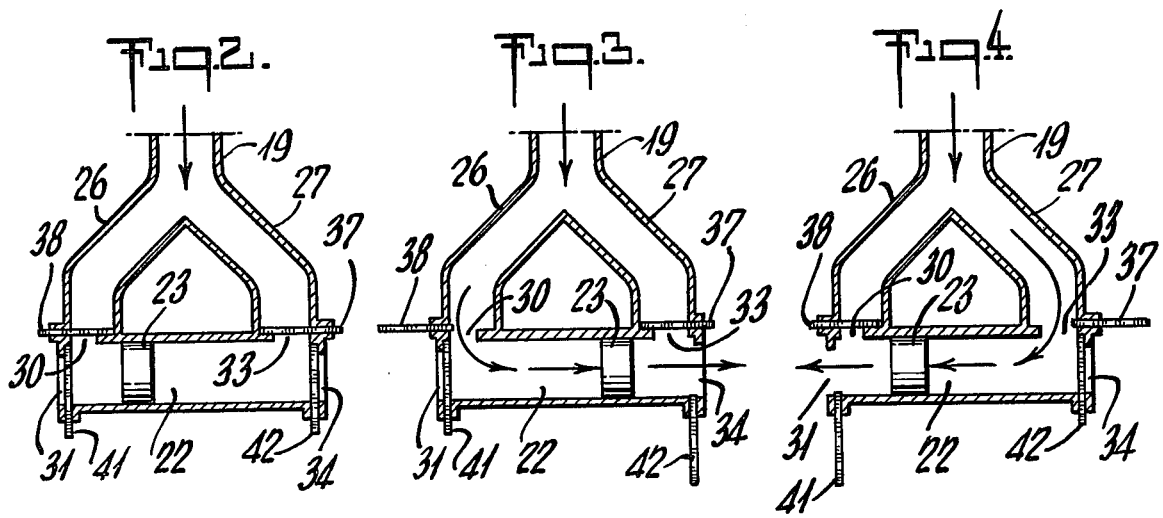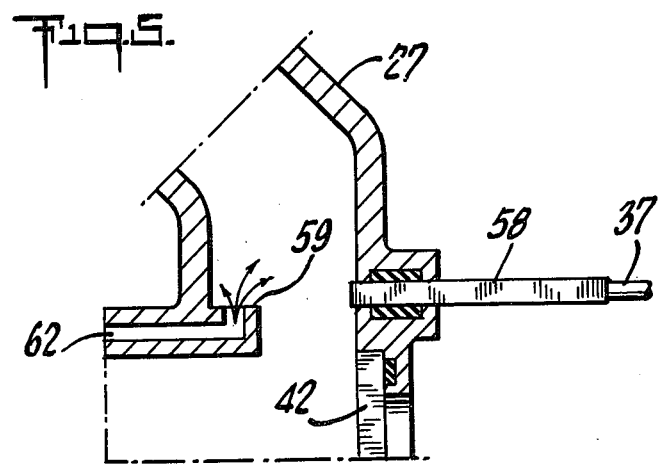

METHOD AND SYSTEM FOR REMOVING SLAG

FIELD OF THE INVENTION

This invention concerns a method and/or apparatus for disposing of slag from a high pressure gasification system that generates liquid slag which is quenched into solid form prior to disposal.

BACKGROUND OF THE INVENTION

Heretofore when the slag from a high pressure gasification operation was to be disposed of, it was allowed to run into a quenching body of water or the like from which it was removed. The removal involved using a lockhopper to retain the pressure in the gasifier. The lockhopper would be opened at the top to permit gravity flow to cause the solidified slag to go into the hopper. The hopper would be closed at the bottom to maintain the gasifier pressure and after a transfer the lockhopper would be closed at the top so that the hopper could be drained from the bottom for removal of the solidified slag. The procedure necessitated the location of the lockhopper beneath the quenching chamber and consequently there was considerable vertical height required for the apparatus.

There is a U.S. patent to Noack No. 2,399,884 which discloses a furnace with arrangement for removing slag without using any liquid quenching medium such as water. It deals with forcing the hot gases containing slag to flow at high velocity through a heat exchanger in order that the slag may not adhere to the heat exchange surfaces due to the high velocity blast effects. It discloses a worm wheel and so called cell runner device for removing the solidified ash particles. There is no quench liquid or other quenching medium indicated in the patent.

BRIEF SUMMARY OF THE INVENTION

The invention is in combination with a high pressure gasifier or the like wherein liquid slag is quenched to a solid for removal thereof. The improvement comprises means for crushing said solid slag to a maximum particle size in a quenching medium under said high pressure, and an elongated chamber having a floating piston therein moveable from one end of said chamber to the other. It also comprises conduit means for connecting said crushing means with quenching medium to both ends of said elongated chamber, and a first valve means associated with said conduit means for alternatively opening said conduit means to one of said chamber ends while closing the other. It also comprises second valve means associated with said elongated chamber ends for permitting discharge of said quenching medium and slag from the end opposite the open one of said first valve means ends.

Again briefly, the invention is in combination with a high pressure gasifier or the like wherein liquid slag is quenched to a solid for removal thereof. It is an improvement which comprises means for crushing said solid slag to a maximum particle size of ¼ inch in water while subject to said high pressure, and an elongated cylindrical chamber having a floating piston therein moveable from one end of said chamber to the other. The said chamber has two ports at each end for connecting with opposite faces of said piston, and a branching conduit for connecting said crushing means with one of said ports at each end of said chamber. The improvement also comprises a pair of first valves one at each branch end of said branching conduit for controlling flow through one of said ports at each end of said chamber, and a conduit connected to the other of said ports at each end of said chamber. It also comprises a pair of second valves for controlling flow through said last named conduits, and a flash drum for permitting gas separation of said crushed slag and water. It also comprises means for joining said last named conduits together and to said flash drum, and a settler for separating and removing said crushed slag. It also comprises means connecting said flash drum with said settler.

Once more briefly, the invention concerns a method of removing slag from a pressurized gasifier or the like wherein liquid slag is formed at high temperature. It comprises the steps of quenching said slag in a fluid quenching medium to solidify it, and crushing said solidified slag to a predetermined maximum size in said quenching medium. It also comprises the steps of applying said gasifier pressure to said crushed slag and quenching medium, and alternatively connecting crushed slag and quenching medium to opposite ends of a complimentary expansible chamber unit while connecting the other sides alternatively to an outlet for removal of the slag.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic diagram illustrating elements of a system for carrying out a method according to the invention;

FIGS. 2, 3, and 4 are schematic cross section showings, somewhat enlarged, of a floating piston unit as it is connected into the system of FIG. 1; and FIG. 5 is a fragmentary schematic (additionally enlarged) in cross section, showing of one of the valves in the floating piston unit illustrated in FIGS. 2-4.

DESCRIPTION OF THE PREFERRED EMBODIMENT

In high pressure gasifiers and particularly those dealing with powdered coal, or the like finely divided material, there is liquid slag formed in the gasification process. Such slag is at a high temperature and it tends to run down the walls of the gasifier and/or to be carried along with the gasification products. If the gasification products exit from the bottom of the gasifier or after passing through a radiant cooler, the slag tends to collect and run down the walls at the bottom.

In the past, removal of such slag has been carried out after quenching to a solid. The quenching was accomplished by passing the gasification products onto the surface of or through a body of quenching medium such as water or the like. Thereafter, for removal of the solidified slag thus quenched, it was the ordinary procedure to have a lockhopper connected at the base of the quenching body of water. Then periodically, the solid slag which sinks to the bottom of the quench pool was permitted to fall out by gravity flow into the lockhopper. A lockhopper has gates top and bottom so that with the top gate open and bottom gate closed, the pressure of the gasifier is maintained while the solid slag passes down by gravity flow. Thereafter, the top gate was closed and the bottom gate opened to drain the lockhopper carrying the slag out therewith. The whole procedure necessitated a relatively large lockhopper vessel which was mounted vertically beneath the quench chamber and which had to have structure for draining it located below the hopper. Therefore, the entire structure was substantial in vertical height required. Also, the heat loss connected with the quantity of water used, was large.

In contrast to the prior manner of handling slag, this invention employs a reciprocating piston device. A preferred embodiment is illustrated in FIG. 1. The elements of the system are connected to the bottom of a high pressure gasifier or radiant cooler 11 which contains a body of water as indicated by the caption 12. The water 12 or other quenching medium acts to quench the liquid slag that is generated in the gasifier. The solidified slag (after quenching) passes into a slag crusher 15 where the solid slag is crushed to a predetermined maximum particle size, preferably ¼ inch. The crusher structure is schematically indicated since it may have any feasible form. It is immersed in the quench medium e.g. water, and the lower end of the structure that has the crusher mounted therein includes a tapered portion 16 which is connected to a branching conduit 19.

There is an elongated cylindrical chamber 22 that has a floating piston 23 therein. Piston 23 is moveable from one end of the chamber 22 to the other. The branching conduit 19 has two branches 26 and 27 that connect the conduit 19 with the chamber 22 at the ends thereof into communication with opposite faces of the piston 23.

As indicated in the enlarged schematics of FIGS. 2, 3 and 4, the cylindrical chamber 22 has two ports 30 and 31 at the left hand end, and ports 33 and 34 at the right hand end. It may be noted that the pair of ports 30 and 31 connect with one face of the floating piston 23 while the other pair of ports 33 and 34 connect with the other face of the piston 23. There is a first pair of valves 37 and 38 that are located one at each end of the branch conduits 27 and 26 respectively in order to control the flow through these branches and through the ports 33 and 30 respectively. In addition, the ports 31 and 34 have valves 41 and 42 respectively associated therewith for controlling the flow out from either end of the chamber 22.

It will be understood that while the valves 37, 38, 41 and 42 are illustrated schematically as being sliding gate valves, the valve structures might take any feasible form that is suitable for controlling the flow. The flow controlling action will be apparent from the description which follows.

There are conduits 45 and 46 which are illustrated schematically by the lines with arrows in FIG. 1. These conduits are connected to the exit ports 31 and 34 of the chamber 22. They are connected together by any feasible means such as a T connector (not shown) so that conduits 45 and 46 are joined into a single conduit 48. Conduit 48 is connected to a flash drum 50 so that gas may separate out. There is a conduit 52 to a settler element 53. In the settler 53 the slag settles out and is removed for disposal (as indicated by the caption) while the quench medium, i.e. water may be recycled or used otherwise as desired.

A sequence of operations that may be employed in carrying out a slag removal procedure according to the invention is indicated in the FIGS. 2, 3 and 4, illustrations. Such a sequence of operations is as follows. Starting with all four valves closed (as illustrated in FIG. 2) the valves 38 and 42 will be opened to produce the conditions as illustrated in FIG. 3. Full gasifier pressure will then be applied to the left hand face (as viewed in the drawings) of the piston 23. It will move to the right, expelling the water and crushed slag out through the port 34. Then valves 38 and 42 will be closed followed by opening of valves 41 and 37 so that the ports 31 and 33 are open as illustrated in FIG. 4. This opens the right hand end of the chamber 22 to the gasifier pressure and opens the left hand end via valve 41 and the port 31 to provide a path for exit of the crushed slag and water through the conduit 45 (FIG. 1). Then, after closing valve 37 and valve 41 the cycle is completed. It may be continued by starting again and repeating the same sequence. It may be noted that the procedure provides a force feed of the combined water and crushed slag for disposal via the flash drum 50 and to the settler 53 through the conduit 52.

As indicated above, it will be appreciated that while the schematic illustrations indicating valves 37, 38, 41 and 42 imply sliding valves, any feasible type of valve may be employed as desired. It will also be appreciated that by determining the relative sizes of the piston chamber 22 and connecting branch conduits, the flow velocity of the water and crushed slag may be maintained at a level so as to minimize erosion of the metal surfaces of the valves from slag particles.

FIG. 5 is an enlarged schematic which illustrates one way for avoiding the catching of slag particles between a valve slide or gate and its seat. Thus, the valve 37 may have a gate 58 that engages a seat 59 when closed. There is a passage 62 that is incorporated in the valve structure so as to open at the valve seat 59. By having clean water or the like connected at a pressure greater than the gasifier pressure, it will create a jet cleaning action to remove any slag particles that would prevent the closing of the valve 37.

METHOD

The method according to this invention deals with removing slag from a pressurized gasifier or the like wherein liquid slag is formed at high temperature. It may be carried out by the following steps. (1) Quenching the slag in a fluid quenching medium to solidify it. It will be appreciated that this step is a part of the usual procedure. It includes the use of a body of water, e.g. water 12 in FIG. 1, which is located at the lower end of the gasifier or radiant cooler structure 11.

(2) Crushing the solidified slag in the quenching water. This step is carried out with any feasible grinding or crushing apparatus so as to create a predetermined size of the solidified slag in the quenching medium. It is contemplated that a maximum size for the crushed slag may be ¼ inch.

(3) Applying the gasifier pressure to the crushed slag and quenching medium. This step is accomplished by having the pressure of the gasifier applied to the body of quench water in which the crushing device is immersed.

(4) Alternatively connecting the crushed slag and quenching water to opposite sides of a complementary expansible chamber unit, while the other side is alternatively connected to an outlet for removal of the slag. This is accomplished with a floating piston in a cylindrical chamber. The quenching water and crushed slag flow through one or the other of a pair of valves at the ends of the chamber while that in the chamber flows out through a complementary one or the other of a different pair of valves also at the ends of the chamber.

Additionally the slag removal may include the steps of degasing the outlet from the expansible chamber unit, and separating the slag from the water for disposal thereof.

While particular embodiments of the invention have been described above in considerable detail in accordance with the applicable statutes, this is not to be taken as in any way limiting the invention but merely as being descriptive thereof.

I claim:

1. In combination with a high pressure gasifier or the like wherein liquid slag is quenched to a solid for removal thereof, the improvement comprising means for crushing said solid slag to a maximum particle size in a quenching medium under said high pressure, an elongated chamber having a floating piston therein movable from one end of said chamber to the other, conduit means for connecting said crushing means with quenching medium to both ends of said elongated chamber, first valve means associated with said conduit means for alternatively opening said conduit means to one of said chamber ends while closing the other, and second valve means associated with said elongated chamber ends for permitting discharge of said quenching medium and slag from the end opposite the open one of said first valve means ends.

2. The invention according to claim 1, wherein the improvement also comprises additional conduit means for carrying said discharged quenching medium and slag to a flash drum for permitting gas separation, and means for connecting said flash drum to settler means for separating and removing said slag.

3. The invention according to claim 1, wherein said conduit means comprises a branching conduit, and said first valve means comprises a valve at each end of said branching conduit.

4. The invention according to claim 3, wherein the improvement also comprises additional conduit means for carrying said discharged quenching medium and slag to a flash drum for permitting gas separation, and means for connecting said flash drum to settler means for separating and removing said slag.

5. The invention according to claim 4, wherein said elongated chamber has two ports at each end for connecting with opposite faces of said piston, flow through one of said ports being controlled by said first valve means, and flow through the other of said ports being controlled by said second valve means.

6. The invention according to claim 5, wherein said additional conduit means comprises a conduit connected to each of said other ports and means for joining them together.

7. In combination with a high pressure gasifier or the like wherein liquid slag is quenched to a solid for removal thereof, the improvement comprising means for crushing said solid slag to a maximum particle size of ¼ inch in water while subject to said high pressure, an elongated cylindrical chamber having a floating piston therein movable from one end of said chamber to the other, said chamber having two ports at each end for connecting with opposite faces of said piston, a branching conduit for connecting said crushing means with one of said ports at each end of said chamber, a pair of first valves one at each branch end of said branching conduit for controlling flow through one of said ports at each end of said chamber, a conduit connected to the other of said ports at each end of said chamber, a pair of second valves for controlling flow through said last named conduits, a flash drum for permitting gas separation of said crushed slag and water, means for joining said last named conduits together and to said flash drum, a settler for separating and removing said crushed slag, and means connecting said flash drum with said settler.

8. Method of removing slag from a pressurized gasifier or the like wherein liquid slag is formed at high temperature, comprising the steps of quenching said slag in a fluid quenching medium to solidify said slag, crushing said solidified slag to a predetermined maximum size in said quenching medium, applying said gasifier pressure to said crushed slag and quenching medium, and alternatively connecting said crushed slag and quenching medium to opposite sides of a complementary expansible chamber unit while connecting the other side to an outlet for removal of the slag.

9. Method according to claim 8, also comprising the steps of degasing said outlet, and separating said slag for disposal.

* * * * *